Patented Mar. 31, 1936

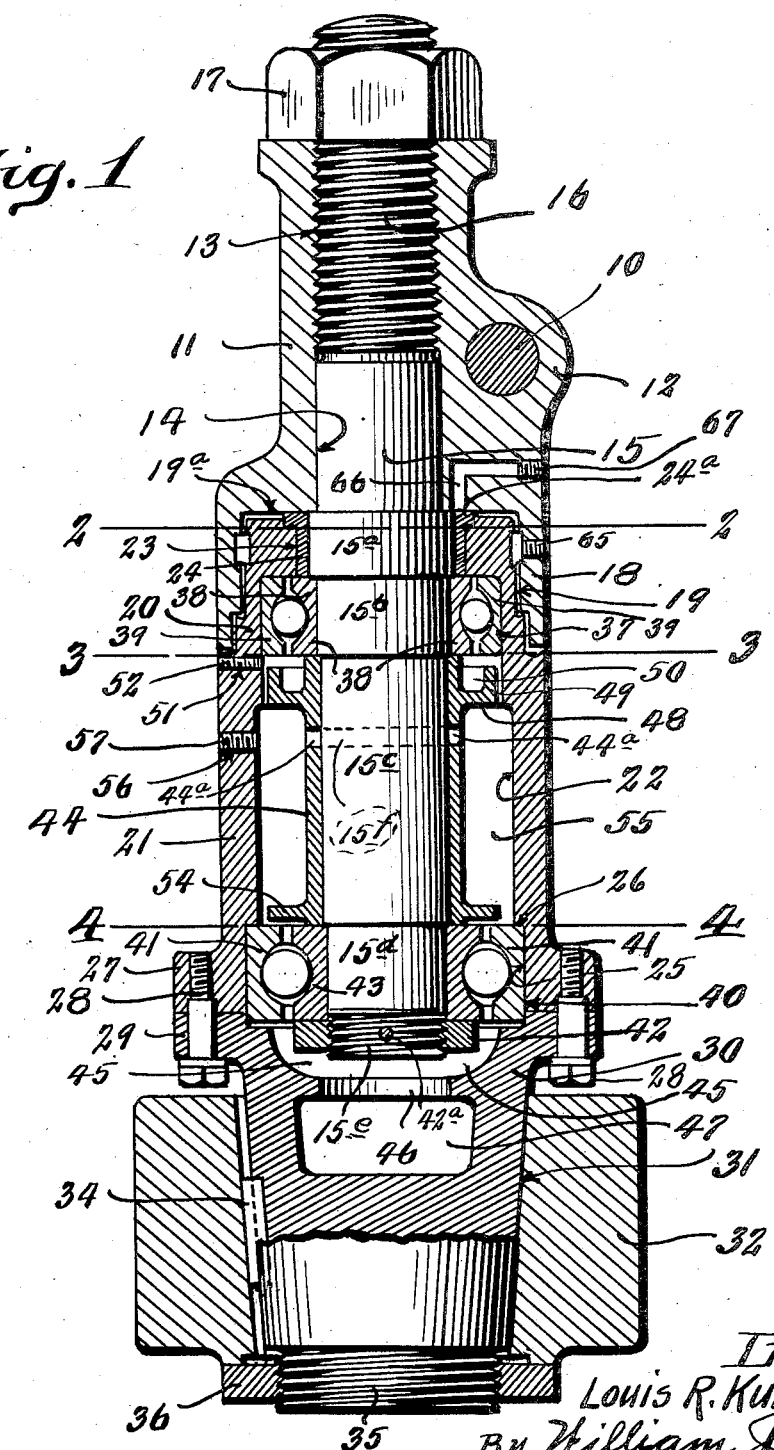

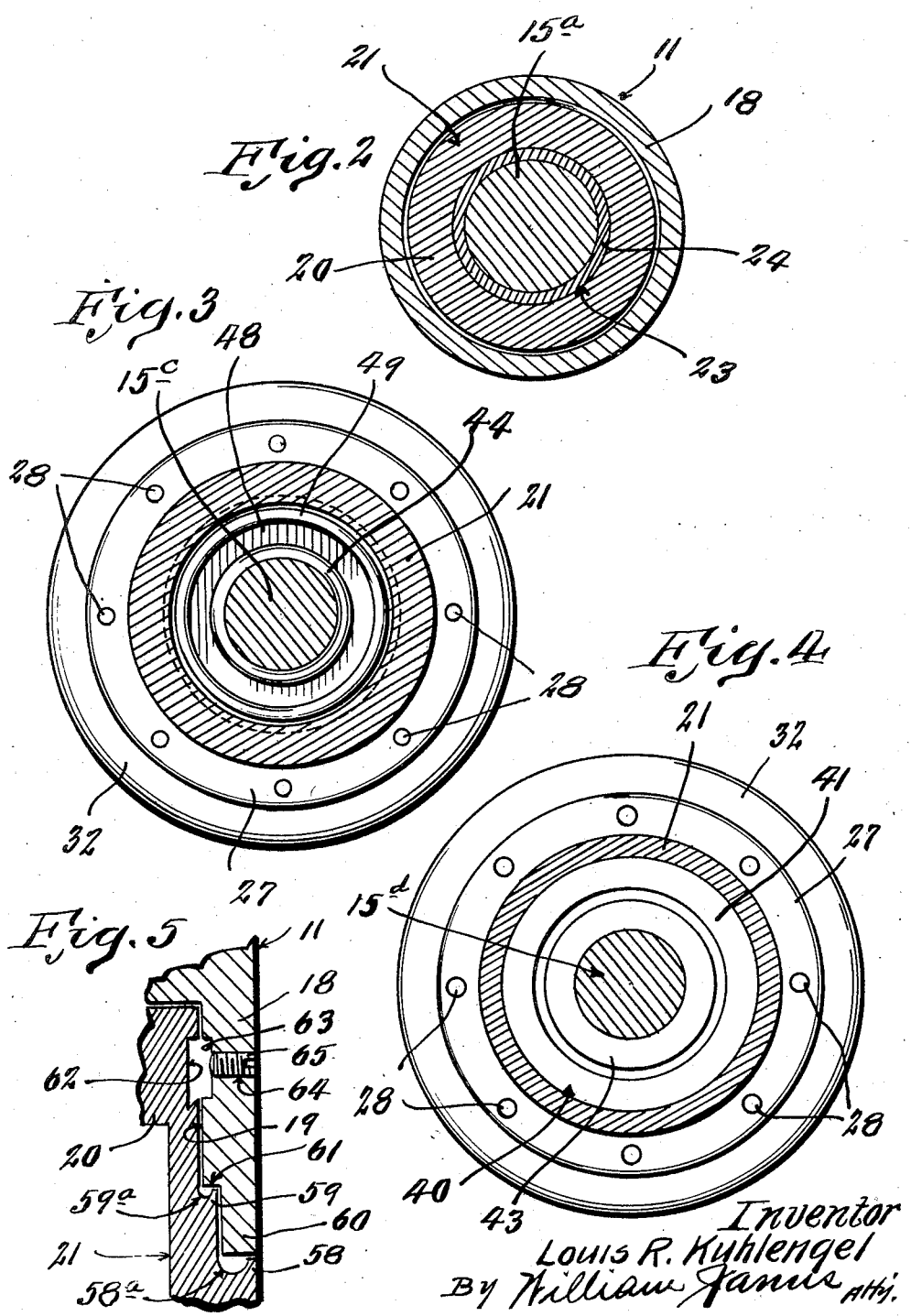

2,035,485

UNITED STATES PATENT OFFICE 2,035,485

ROLLER JOURNAL

Louis R. Kuhlengel, St. Louis, Mo., assignor to Williams Patent Crusher and Pulverizer Company, St. Louis, Mo., a corporation of Missouri Application March 12, 1934, Serial No. 715,123

3 Claims. (Cl. 308—230)

This invention relates to new and useful improvements in roller journals for roller mills. In this type of mill the pulverent material is ground between a horizontally disposed stationary ring called "bull" ring, and a plurality of rollers, which latter are revolubly mounted on pendent journals or arms for rotation about the axis of said ring and are forced against the inner or grinding surface thereof by the centrifugal action.

The journals or arms are pivotally suspended at their upper ends from suitable arms of a support or spider carried by a vertically disposed revoluble shaft.

Among the main objects of the invention is the provision of a journal which is of simple construction so that it can be economically manufactured, which is of durable construction, and which forms an efficient bearing for the rotating parts supporting the roller.

Other objects of the invention are to provide a roller journal provided with ball bearings for revolubly supporting the rotating parts of the journal and the roller carried thereby, said journal having a large lubricating capacity whereby said bearings are at all times amply lubricated without requiring attention at frequent intervals.

Further objects of the invention are to provide improved means for supporting the rotating parts of the journal on the stationary part thereof and to provide an efficient seal for excluding dust from the interior of said journal.

With these and other objects in view my invention consists in certain novel features of construction and arrangement of parts, hereinafter more fully described and claimed, and illustrated in the accompanying drawings, in which—

Figure 1 is a vertical cross section through my improved roller journal.

Figure 2 is an enlarged horizontal cross section taken on line 2—2 of Figure 1.

Figure 3 is an enlarged horizontal cross section taken on lline 3—3 of Figure 1.

Figure 4 is an enlarged horizontal cross section taken on line 4—4 of Figure 1.

Figure 5 is an enlarged fragmental cross section showing the heavy grease sealing joint between the stationary and revoluble casing member.

Referring by numerals to the accompanying drawings, 10 indicates a horizontally disposed trunnion shaft of a revoluble support or spider (not shown). A casing 11 is provided on one side with an integrally formed horizontally disposed extension 12 for receiving shaft 10 and pivotally supporting said casing in position. This casing 11 is formed with an axially disposed bore 14 in which is received the upper portion of a shaft 15. Casing 11 forms the upper stationary part of the journal and shaft 15 is held in fixed position therein and extends downwardly therefrom.

The upper end of casing 11 is internally screw-threaded, as indicated at 13, and the upper end of shaft 15 is screw-threaded as indicated at 16 for engagement with said screw-threaded bore 13. The upper extremity of shaft 15 extends outwardly from casing 10 and receives a nut 17 which can be tightened against said upper end of casing 11 to lock said shaft against displacement.

The lower end of casing 11 terminates in an annular skirt or downwardly presented flange 18 forming an enlarged bore 19. The upper end 20 of a revoluble casing member 21 is received in the bore 19.

This revoluble casing member 21 is formed with an axially disposed comparatively large bore 22, the upper end of which is reduced in diameter, as indicated at 23, and receives a tubular bearing 24 which is engaged by shaft 15. This bearing 24 is provided at its upper end with a laterally disposed collar 24a which is seated in the upper end of said revoluble casing 21. The lower end of bore 22 is enlarged as indicated at 25, thereby forming a downwardly presented annular shoulder 26. The lower end of casing 21 is formed with a laterally projecting flange 27 to which is attached, by bolts 28, a similarly formed flange 29 of a terminal member 30. This member is downwardly tapered, as indicated at 31 to receive a suitably tapered bore of a roller 32. A key 34 holds the roller non-rotatively on member 30.

The lower end of member 30 is provided with an externally screw-threaded extension 35 on which is screw-seated a nut 36 which prevents displacement of roller from member 30.

Shaft 15 is formed with an enlargement 15a which has bearing in sleeve 24. The upper end of this enlargement bears against the shoulder 19a formed by the enlarged bore 19. A shouldered portion 15b is formed on shaft 15 immediately below portion 15a and is of smaller diameter than the latter. A ball bearing 37 is arranged on portion 15b and the inner ball race member 38 thereof has its upper end bearing against the lower end of portion 15a, while the outer ball race member 39 has its upper end bearing against the shoulder formed by the reduced upper end 23 of casing 21.

A comparatively long portion 15c of reduced diameter extends downwardly from portion 15b and has its lower end terminating on a horizontal plane with shoulder 26 of casing 21. The shaft portion 15d disposed below portion 15c is reduced in diameter and receives a ball bearing 40. The lower end of said portion 15d is provided with an external screw-thread, as indicated at 15e, and receives a nut 42.

Ball bearing 40 has its inner ball race member 41 engaged at its upper end by the lower end or shoulder of portion 15c while its lower end is engaged by nut 42, while the outer ball race member 43 is disposed within the enlarged bore 25 and has its upper end engaging shoulder 26.

A sleeve 44 is arranged on portion 15c and the upper end thereof bears against the shoulder or lower end of portion 15b and the underside of the inner ball race member 38 of bearing 37. The lower end of said sleeve 44 bears against the upper end of the inner ball race member 42 of bearing 40. Thus bearings 37 and 40 and sleeve 44 are held in assembled relation on shaft 15 by nut 42 and the casing 21 and parts associated therewith are revolubly supported on said shaft by said bearings.

The upper end of member 30 is formed with a concave or dished-out recess 45 to provide a suitable clearance for the threaded end 15e of shaft 15 and nut 42. An opening 46 connects recess 45 with a sump or reservoir 47, which latter is formed in member 30 below this recess.

Sleeve 44 has formed integral therewith near its upper end a radial flange 48 which terminates in an upwardly presented annular flange 49. Thus a circular chamber or trough 50 is formed which opens upwardly and holds a supply of lubricant, such as grease, in close proximity to the bearing 37. Flange 49 is preferably spaced from casing 21 to provide operating clearance therebetween. The upper edge of this flange 49 is disposed below the horizontal plane of the upper end of sleeve 44 and casing 21 is provided with a radially disposed opening or bore 51 on a horizontal plane above said upper edge so that lubricant can be introduced into said chamber 50. A screw plug 52 is used to close said opening 51.

A circular flange 54 is formed integral with sleeve 44 near the lower end thereof and the edge of this flange is spaced from the face of bore 22 to provide operating clearance and permit grease to flow from annular chamber 55 on to bearing 40. This annular chamber 55 is formed in bore 22 by sleeve 44 and the flanged portions thereof. It serves to hold a supply of lubricant which is introduced thereinto through an opening 56 formed radially in casing 21 near the upper end of said chamber 55. A screw plug 57 is used to close said opening.

The ends 18 and 20 of casing members 11 and 21 have stepped or shoulder engagement with each other. The upper end 20 of the revoluble casing member 21 has two spaced-apart upwardly presented annular shoulders 58 and 59. The end 18 of stationary casing member 11 has its annular edge 60 disposed immediately above shoulder 59 while a downwardly presented shoulder 61 formed in bore 19 is disposed above upwardly presented shoulder 58. The end 20 is formed a suitable distance above the uppermost shoulder with a peripheral groove 62 and bore 19 is formed with a peripheral groove 63 arranged in the same horizontal plane with groove 62. Thus the two grooves combine to form an annular chamber, the access to which is through a bore or aperture 64 formed in skirt 18. This aperture is screw-threaded and is normally closed by a screw plug 65. The annular chamber is filled with heavy grease through aperture 64 and forms a dust-proof seal between the stationary member 11 and revoluble member 21. During the operation, some of the grease finds its way downwardly between the two members and enters the shouldered portions. The upwardly presented annular shoulders 58 and 59 are provided, respectively, with upwardly presented grooves 58a and 59a which retain the grease and form additional seals between the casing members.

Bearing 24 is lubricated by light oil which is admitted through a duct 66 formed in member 11 above skirt portion 18. The inner end of this duct opens adjacent to the upper end of said bearing while the outer end is normally closed by a screw plug 67.

Ball bearing 37 is lubricated by grease which flows into chamber 50 through bore 51 when plug 52 is removed. The surplus grease enters chamber 55. However, to facilitate the admission of grease into the last-mentioned chamber plug 57 can be removed and grease forced into member 21 through bore 56. The grease is forced from chamber 55 into bearing 40 and thence into sump 47. Thus bearings 37 and 40 are amply supplied with grease and chamber 55 receives sufficient amount of grease so that refilling is required at comparatively long intervals.

In assembling the journal, member 21, bearings 37 and 40, and sleeve 44 are placed on shaft 15 and secured in position by nut 42 which is then locked in place by a pin 42a. Terminal member 30 is now attached to member 21 by bolts 28 and roller 32 is mounted on member 30. The shaft 15 with the revoluble structure attached thereto is then screw-threaded into member 11. During this operation, shaft 15 is preferably held in fixed relation with the revoluble member 21 by means of a tool which is inserted through bore 56 and aperture 44a in sleeve 44 into a bore 15f radially disposed in shaft portion 15c. After the journal is assembled, oil is supplied to conduit 24a and grease to bearings 37 and 40 as hereinbefore described.

I claim:

1. In a roller journal construction, the combination of a stationary casing member, a shaft fixed therein and projecting below the lower end thereof, a revoluble casing member revoluble mounted on and enclosing the projecting portion of said shaft and having its upper end enclosed within the lower end of said stationary casing member, the upper end of said revoluble casing member being provided with a plurality of upwardly presented annular shoulders and the lower end of said stationary casing member being provided with a corresponding number of downwardly presented annular shoulders, whereby a multiple stepped joint is provided between the two ends of said casing member, and means for supplying heavy grease to the shouldered portions of said casing member ends.

2. In a roller journal construction, the combination of a stationary casing member, a shaft fixed therein and projecting below the lower end thereof, a revoluble casing member revolubly mounted on and enclosing the projecting portion of said shaft and having its upper end enclosed within the lower end of said stationary casing member, said upper end of said revoluble casing member being provided with a plurality of upwardly presented annular shoulders, each of which is formed with an upwardly presented grease retaining groove, the lower end of said stationary casing member being provided with a corresponding number of downwardly presented annular shoulders, thereby providing a plurality of stepped joints between said ends of said casing members, said stationary casing member being provided with an opening through which heavy grease is forced between said interengaged ends and fills the grooves in the annular shoulders of said revoluble casing member.

3. In a roller journal construction, the combination of a stationary casing member, a shaft fixed therein and projecting below the lower end thereof, a revoluble casing member revolubly mounted on and enclosing the projecting portion of said shaft and having its upper end enclosed within the lower end of said stationary casing member, said upper end of said revoluble casing member being provided with a plurality of upwardly presented annular shoulders, each of which is formed with an upwardly presented grease-retaining groove and the lower end of said stationary casing member being provided with a corresponding number of downwardly presented annular shoulders, whereby a plurality of stepped joints is formed between said ends, the adjacent faces of said interengaged ends being provided above the uppermost stepped joint with opposed peripheral grooves arranged in the same horizontal plane and forming a grease receiving chamber, said stationary casing member being formed with a bore opening into said chamber to admit grease thereinto, and a screw-plug for closing said bore.

LOUIS R. KUHLENGEL.